United States Patent
Ngantung et al.

(10) Patent No.: US 10,081,760 B2
(45) Date of Patent: Sep. 25, 2018

(54) OLEFINIC ESTER COMPOSITIONS AND THEIR USE IN STIMULATING HYDROCARBON PRODUCTION FROM A SUBTERRANEAN FORMATION

(71) Applicant: Elevance Renewable Sciences, Inc., Woodridge, IL (US)

(72) Inventors: Frederyk Ngantung, Woodridge, IL (US); Robin Weitkamp, Woodridge, IL (US)

(73) Assignee: Elevance Renewable Sciences, Inc., Woodridge, IL (US)

(*) Notice: Subject to any disclaimer, the term of this patent is extended or adjusted under 35 U.S.C. 154(b) by 211 days.

(21) Appl. No.: 14/855,018

(22) Filed: Sep. 15, 2015

(65) Prior Publication Data

US 2016/0096989 A1    Apr. 7, 2016

Related U.S. Application Data

(63) Continuation-in-part of application No. 14/596,092, filed on Jan. 13, 2015.

(60) Provisional application No. 61/928,290, filed on Jan. 16, 2014, provisional application No. 62/006,655, filed on Jun. 2, 2014, provisional application No. 62/075,055, filed on Nov. 4, 2014, provisional application No. 62/081,933, filed on Nov. 19, 2014, provisional application No. 62/089,665, filed on Dec. 9, 2014.

(51) Int. Cl.
*C09K 8/52* (2006.01)
*C09K 8/60* (2006.01)
*C09K 8/86* (2006.01)
*C09K 8/524* (2006.01)

(52) U.S. Cl.
CPC .............. *C09K 8/602* (2013.01); *C09K 8/524* (2013.01); *C09K 8/86* (2013.01)

(58) Field of Classification Search
CPC .......... C09K 8/602; C09K 8/86; C09K 8/524
USPC .......................................................... 507/90
See application file for complete search history.

(56) References Cited

U.S. PATENT DOCUMENTS

| | | | |
|---|---|---|---|
| 4,224,307 A * | 9/1980 | Thiele | A61K 8/361 424/49 |
| 5,143,639 A | 9/1992 | Krawack | |
| 7,541,315 B2 | 6/2009 | Jennings | |
| 2004/0224854 A1 | 11/2004 | Boudreau et al. | |
| 2008/0033026 A1 | 2/2008 | Zullo et al. | |

(Continued)

FOREIGN PATENT DOCUMENTS

WO         01/74966         10/2001

OTHER PUBLICATIONS

Int'l Search Report, PCT App. No. PCT/US2015/011233, dated Apr. 20, 2015.

*Primary Examiner* — Aiqun Li
(74) *Attorney, Agent, or Firm* — Robert S. Dailey

(57) ABSTRACT

Compositions for stimulating hydrocarbon production from a subterranean formation are generally disclosed. In some embodiments, such compositions include olefinic ester compounds, such as alkyl esters of C10-18 unsaturated fatty acids. In some embodiments, the olefinic ester compounds are derived from a natural oil or a natural oil derivative, for example, by catalytic olefin metathesis. Uses of such compounds, such as in oil- and gas-production methods are also generally disclosed.

12 Claims, 1 Drawing Sheet

(56) References Cited

U.S. PATENT DOCUMENTS

| | | | |
|---|---|---|---|
| 2010/0047198 A1* | 2/2010 | Striepling | ........... B01F 17/0085 424/59 |
| 2010/0292328 A1 | 11/2010 | Althaus et al. | |
| 2013/0225469 A1 | 8/2013 | Allen et al. | |
| 2013/0281688 A1 | 10/2013 | Di Blase et al. | |

* cited by examiner

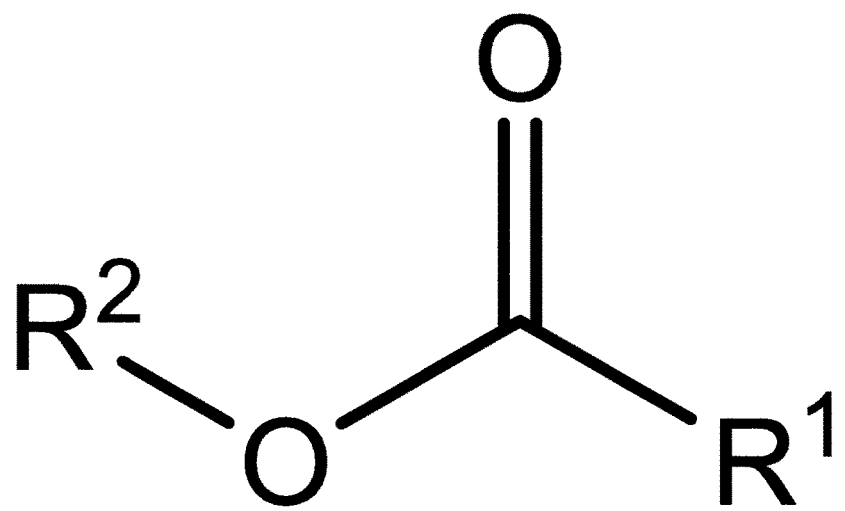

OLEFINIC ESTER COMPOSITIONS AND THEIR USE IN STIMULATING HYDROCARBON PRODUCTION FROM A SUBTERRANEAN FORMATION

CROSS-REFERENCE TO RELATED APPLICATIONS

The present application is a continuation-in-part application of U.S. patent application Ser. No. 14/596,092, filed Jan. 13, 2015, which claims the benefit of priority of U.S. Provisional Application No. 61/928,290, filed Jan. 16, 2014; 62/006,655, filed Jun. 2, 2014; 62/075,055, filed Nov. 4, 2014; 62/081,933, filed Nov. 19, 2014; and 62/089,665, filed Dec. 9, 2014. Each of the foregoing applications is hereby incorporated by reference as though fully set forth herein in its entirety.

TECHNICAL FIELD

Compositions for stimulating hydrocarbon production from a subterranean formation are generally disclosed. In some embodiments, such compositions include olefinic ester compounds, such as alkyl esters of $C_{10-18}$ unsaturated fatty acids. In some embodiments, the olefinic ester compounds are derived from a natural oil or a natural oil derivative, for example, by catalytic olefin metathesis. Uses of such compounds, such as in oil- and gas-production methods are also generally disclosed.

BACKGROUND

Well stimulation has become a common technique used in the extraction of hydrocarbons, such as natural gas and crude oil, from subterranean formations. One such stimulation technique is hydraulic fracturing, where certain subterranean formations are treated with fluids (e.g., under high pressure) to introduce fractures into the formation and release trapped hydrocarbons.

The hydraulic fracturing process generally relies on the use of certain fluids, called fracturing fluids, which are introduced into the subterranean formation, usually under high pressure. Such fluids are typically aqueous, but also contain other chemical agents to assist in the process. These additives play a number of roles. In some instances, these additives help to prevent the injected fluids from clogging pores in the formation, which would otherwise reduce the yield of hydrocarbons extracted from the formation.

In some cases, terpenes, such as d-limonene and/or nopol, have been added to fracturing fluids to serve this purpose. But terpenes often must be extracted from natural sources, which can cause their price to be unacceptably high and their availability to be unpredictable.

Thus, there is a continuing need to develop further compounds that can be used in fracturing fluids, and which can be supplied on a consistent basis and at a consistent price.

SUMMARY

In a first aspect, the disclosure provides compositions for stimulating an oil or gas well, the composition comprising olefinic ester compounds, wherein the olefinic ester compounds are $C_{1-6}$ alkanol esters or $C_{3-10}$ cycloalkanol esters of $C_{10-18}$ carboxylic acids having one or more carbon-carbon double bonds.

In an eighth aspect, the disclosure provides methods for stimulating an oil or gas well (e.g., a shale gas well or a tight gas well), including: providing a composition according to the first aspect; and introducing the composition to an oil or gas well. In some embodiments, the introducing includes injecting the composition to the subterranean gas well under pressure.

Further aspects and embodiments are provided in the foregoing drawings, detailed description and claims.

BRIEF DESCRIPTION OF THE DRAWINGS

The following drawings are provided for purposes of illustrating various embodiments of the compositions and methods disclosed herein. The drawings are provided for illustrative purposes only, and are not intended to describe any preferred compositions or preferred methods, or to serve as a source of any limitations on the scope of the claimed inventions.

FIG. 1 shows an example of an olefinic ester compound of certain embodiments disclosed herein, where $R^1$ is a $C_{9-17}$ alkenyl group and $R^2$ is a $C_{1-6}$ alkyl group or a $C_{3-10}$ cycloalkyl group.

DETAILED DESCRIPTION

The following description recites various aspects and embodiments of the compositions and methods disclosed herein. No particular embodiment is intended to define the scope of the invention. Rather, the embodiments provide non-limiting examples of various compositions and methods. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "natural oil," "natural feedstock," or "natural oil feedstock" refer to oils derived from plants or animal sources. These terms include natural oil derivatives, unless otherwise indicated. The terms also include modified plant or animal sources (e.g., genetically modified plant or animal sources), unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

As used herein, "natural oil derivatives" refers to the compounds or mixtures of compounds derived from a natural oil using any one or combination of methods known in the art. Such methods include but are not limited to saponification, fat splitting, transesterification, esterification, hydrogenation (partial, selective, or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a feedstock includes canola or soybean oil, as a non-limiting example, refined, bleached, and deodorized soybean oil (i.e., RBD soybean oil). Soybean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9, 12-octadecadienoic acid), and linolenic acid (9,12,15-octadecatrienoic acid).

As used herein, "metathesis catalyst" includes any catalyst or catalyst system that catalyzes an olefin metathesis reaction.

As used herein, "metathesize" or "metathesizing" refer to the reacting of a feedstock in the presence of a metathesis catalyst to form a "metathesized product" comprising new olefinic compounds, i.e., "metathesized" compounds. Metathesizing is not limited to any particular type of olefin metathesis, and may refer to cross-metathesis (i.e., co-metathesis), self-metathesis, ring-opening metathesis, ring-opening metathesis polymerizations ("ROMP"), ring-closing metathesis ("RCM"), and acyclic diene metathesis ("ADMET"). In some embodiments, metathesizing refers to reacting two triglycerides present in a natural feedstock (self-metathesis) in the presence of a metathesis catalyst, wherein each triglyceride has an unsaturated carbon-carbon double bond, thereby forming a new mixture of olefins and esters which may include a triglyceride dimer. Such triglyceride dimers may have more than one olefinic bond, thus higher oligomers also may form. Additionally, in some other embodiments, metathesizing may refer to reacting an olefin, such as ethylene, and a triglyceride in a natural feedstock having at least one unsaturated carbon-carbon double bond, thereby forming new olefinic molecules as well as new ester molecules (cross-metathesis).

As used herein, "hydrocarbon" refers to an organic group composed of carbon and hydrogen, which can be saturated or unsaturated, and can include aromatic groups. The term "hydrocarbyl" refers to a monovalent or polyvalent hydrocarbon moiety.

As used herein, "olefin" or "olefins" refer to compounds having at least one unsaturated carbon-carbon double bond. In certain embodiments, the term "olefins" refers to a group of unsaturated carbon-carbon double bond compounds with different carbon lengths. Unless noted otherwise, the terms "olefin" or "olefins" encompasses "polyunsaturated olefins" or "poly-olefins," which have more than one carbon-carbon double bond. As used herein, the term "monounsaturated olefins" or "mono-olefins" refers to compounds having only one carbon-carbon double bond. A compound having a terminal carbon-carbon double bond can be referred to as a "terminal olefin" or an "alpha-olefin," while an olefin having a non-terminal carbon-carbon double bond can be referred to as an "internal olefin." In some embodiments, the alpha-olefin is a terminal alkene, which is an alkene (as defined below) having a terminal carbon-carbon double bond. Additional carbon-carbon double bonds can be present.

The number of carbon atoms in any group or compound can be represented by the terms: "$C_z$", which refers to a group of compound having z carbon atoms; and "$C_{x-y}$", which refers to a group or compound containing from x to y, inclusive, carbon atoms. For example, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. As a further example, a "$C_{4-10}$ alkene" refers to an alkene molecule having from 4 to 10 carbon atoms, and, for example, includes, but is not limited to, 1-butene, 2-butene, isobutene, 1-pentene, 1-hexene, 3-hexene, 1-heptene, 3-heptene, 1-octene, 4-octene, 1-nonene, 4-nonene, and 1-decene.

As used herein, the term "low-molecular-weight olefin" may refer to any one or combination of unsaturated straight, branched, or cyclic hydrocarbons in the $C_{2-14}$ range. Low-molecular-weight olefins include alpha-olefins, wherein the unsaturated carbon-carbon bond is present at one end of the compound. Low-molecular-weight olefins may also include dienes or trienes. Low-molecular-weight olefins may also include internal olefins or "low-molecular-weight internal olefins." In certain embodiments, the low-molecular-weight internal olefin is in the $C_{4-14}$ range. Examples of low-molecular-weight olefins in the $C_{2-6}$ range include, but are not limited to: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. Non-limiting examples of low-molecular-weight olefins in the $C_{7-9}$ range include 1,4-heptadiene, 1-heptene, 3,6-nonadiene, 3-nonene, 1,4,7-octatriene. Other possible low-molecular-weight olefins include styrene and vinyl cyclohexane. In certain embodiments, it is preferable to use a mixture of olefins, the mixture comprising linear and branched low-molecular-weight olefins in the $C_{4-10}$ range. Olefins in the $C_{4-10}$ range can also be referred to as "short-chain olefins," which can be either branched or unbranched. In one embodiments, it may be preferable to use a mixture of linear and branched $C_4$ olefins (i.e., combinations of: 1-butene, 2-butene, and/or isobutene). In other embodiments, a higher range of $C_{11-14}$ may be used.

In some instances, the olefin can be an "alkene," which refers to a straight- or branched-chain non-aromatic hydrocarbon having 2 to 30 carbon atoms and one or more carbon-carbon double bonds, which may be optionally substituted, as herein further described, with multiple degrees of substitution being allowed. A "monounsaturated alkene" refers to an alkene having one carbon-carbon double bond, while a "polyunsaturated alkene" refers to an alkene having two or more carbon-carbon double bonds. A "lower alkene," as used herein, refers to an alkene having from 2 to 10 carbon atoms.

As used herein, "ester" or "esters" refer to compounds having the general formula: R—COO—R', wherein R and R' denote any organic group (such as alkyl, aryl, or silyl groups) including those bearing heteroatom-containing substituent groups. In certain embodiments, R and R' denote alkyl, alkenyl, aryl, or alcohol groups. In certain embodiments, the term "esters" may refer to a group of compounds with the general formula described above, wherein the compounds have different carbon lengths. In certain embodiments, the esters may be esters of glycerol, which is a trihydric alcohol. The term "glyceride" can refer to esters where one, two, or three of the —OH groups of the glycerol have been esterified.

It is noted that an olefin may also comprise an ester, and an ester may also comprise an olefin, if the R or R' group in the general formula R—COO—R' contains an unsaturated carbon-carbon double bond. Such compounds can be referred to as "unsaturated esters" or "olefin ester" or "olefinic ester compounds." Further, a "terminal olefinic ester compound" may refer to an ester compound where R has an olefin positioned at the end of the chain. An "internal olefin ester" may refer to an ester compound where R has an olefin positioned at an internal location on the chain. Additionally, the term "terminal olefin" may refer to an ester or an acid thereof where R' denotes hydrogen or any organic compound (such as an alkyl, aryl, or silyl group) and R has an olefin positioned at the end of the chain, and the term "internal olefin" may refer to an ester or an acid thereof where R' denotes hydrogen or any organic compound (such as an alkyl, aryl, or silyl group) and R has an olefin positioned at an internal location on the chain.

As used herein, "acid," "acids," "carboxylic acid," or "carboxylic acids" refer to compounds having the general formula: R—COOH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "acids" or "carboxylic acids" may refer to a group of compounds with the general formula described above, wherein the compounds have different carbon lengths.

As used herein, "alcohol" or "alcohols" refer to compounds having the general formula: R—OH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "alcohol" or "alcohols" may refer to a group of compounds with the general formula described above, wherein the compounds have different carbon lengths. As used herein, the term "alkanol" refers to alcohols where R is an alkyl group, and the term "cycloalkanol" refers to alcohols where R is a cycloalkyl group.

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. In some instances, the "alkyl" group can be divalent, in which case the group can alternatively be referred to as an "alkylene" group.

As used herein, "alkenyl" refers to a straight or branched chain non-aromatic hydrocarbon having 2 to 30 carbon atoms and having one or more carbon-carbon double bonds, which may be optionally substituted, as herein further described, with multiple degrees of substitution being allowed. Examples of "alkenyl," as used herein, include, but are not limited to, ethenyl, 2-propenyl, 2-butenyl, and 3-butenyl. In some instances, the "alkenyl" group can be divalent, in which case the group can alternatively be referred to as an "alkenylene" group.

As used herein, "cycloalkyl" refers to an aliphatic saturated or unsaturated hydrocarbon ring system having 3 to 20 carbon atoms, which may be optionally substituted, as herein further described, with multiple degrees of substitution being allowed. In some embodiments, the term refers only to saturated hydrocarbon ring systems, substituted as herein further described. Examples of "cycloalkyl," as used herein, include, but are not limited to, cyclopropyl, cyclobutyl, cyclopentyl, cyclohexyl, cyclohexenyl, cycloheptyl, cyclooctyl, adamantyl, and the like. In some embodiments, the cycloalkyl groups are fully saturated. In some other embodiments, the cycloalkyl and groups can contain one or more carbon-carbon double bonds.

As used herein, "halogen" or "halo" refers to a fluorine, chlorine, bromine, and/or iodine atom. In some embodiments, the terms refer to fluorine and/or chlorine.

As used herein, "substituted" refers to substitution of one or more hydrogen atoms of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, "yield" refers to the amount of reaction product formed in a reaction. When expressed with units of percent (%), the term yield refers to the amount of reaction product actually formed, as a percentage of the amount of reaction product that would be formed if all of the limiting reactant were converted into the product.

As used herein, "mix" or "mixed" or "mixture" refers broadly to any combining of two or more compositions. The two or more compositions need not have the same physical state; thus, solids can be "mixed" with liquids, e.g., to form a slurry, suspension, or solution. Further, these terms do not require any degree of homogeneity or uniformity of composition. This, such "mixtures" can be homogeneous or heterogeneous, or can be uniform or non-uniform. Further, the terms do not require the use of any particular equipment to carry out the mixing, such as an industrial mixer.

As used herein, "hydrophilic-lipophilic balance" or "HLB," with reference to surfactants refers to the property when determined by Griffin's method: HLB=20*($M_h$/M), where $M_h$ is the molecular weight of the hydrophilic portion of the molecule and M is the molecular weight of the molecule as a whole. Various commercial test kits can be purchased that permit one to measure the HLB of a surfactant by comparing the properties of the surfactant in question with the properties of a surfactant having a known HLB value.

As used herein, the term "olefinic ester compounds" refers to esters of olefinically unsaturated $C_{10-18}$ aliphatic carboxylic acids and $C_{1-20}$ aliphatic alcohols.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

As used herein, the various functional groups represented will be understood to have a point of attachment at the functional group having the hyphen or dash (-) or an asterisk (*). In other words, in the case of —$CH_2CH_2CH_3$, it will be understood that the point of attachment is the $CH_2$ group at the far left. If a group is recited without an asterisk or a dash, then the attachment point is indicated by the plain and ordinary meaning of the recited group.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

Other terms are defined in other portions of this description, even though not included in this subsection.

Compositions Including Olefinic Ester Compounds

In certain aspects, the disclosure provides compositions for stimulating an oil or gas well, the composition comprising olefinic ester compounds, wherein the olefinic ester compounds are $C_{1-6}$ alkanol esters or $C_{3-10}$ cycloalkanol esters of $C_{10-18}$ carboxylic acids, said carboxylic acids having one or more carbon-carbon double bonds.

Any suitable olefin ester compounds can be used in the compositions. In some embodiments, the olefinic ester compounds are alkanol esters, e.g., $C_{1-6}$ alkanol esters, of $C_{10-18}$ carboxylic acids having at least one carbon-carbon double bond. In some embodiments, the olefinic ester compounds are cycloalkanol esters, e.g., $C_{3-10}$ cycloalkanol esters, of $C_{10-18}$ carboxylic acids having at least one carbon-carbon double bond.

Suitable alkanols include, but are not limited to, methanol, ethanol, propanol, isopropanol, butanol, isobutanol, tert-butyl alcohol, pentanol, isoamyl alcohol, neopentyl alcohol, and hexanol. In some embodiments, the alkanol is methanol, ethanol, or isopropanol. In some embodiments, the alkanol is methanol or ethanol. In some embodiments, the alkanol is methanol. Suitable cycloalkanols include, but are not limited to cyclohexanol or cyclopentanol. In some embodiments, the cycloalkanol is cyclohexanol.

Any suitable $C_{10-18}$ carboxylic acid can be employed in such esters, including branched and unbranched carboxylic acids.

In some such embodiments, the olefinic ester compounds are alkanol or cycloalkanol esters of $C_{10-16}$ carboxylic acids having one to three carbon-carbon double bonds, or alkanol or cycloalkanol esters of $C_{10-15}$ carboxylic acids having one to three carbon-carbon double bonds, or alkanol or cycloalkanol esters of $C_{10-14}$ carboxylic acids having one to three carbon-carbon double bonds, or alkanol or cycloalkanol esters of $C_{10-12}$ carboxylic acids having one to three carbon-carbon double bonds, or alkanol or cycloalkanol esters of $C_{12-18}$ carboxylic acids having one to three carbon-carbon double bonds, or alkanol or cycloalkanol esters of $C_{12-16}$ carboxylic acids having one to three carbon-carbon double bonds, or alkanol or cycloalkanol esters of $C_{12-15}$ carboxylic acids having one to three carbon-carbon double bonds, or alkanol or cycloalkanol esters of $C_{12-14}$ carboxylic acids having one to three carbon-carbon double bonds. In some of the aforementioned embodiments, the esters are alkanol esters. In some other embodiments, the esters are cycloalkanol esters. Any alkanols or cycloalkanols of the aforementioned embodiments can be used.

In some embodiments, where the carboxylic acid has two or three carbon-carbon double bonds, none of the carbon-carbon double bands are conjugated, either to each other or to other unsaturation in the compound. In some other embodiments, the carboxylic acid group has a single carbon-carbon double bond. In some embodiments, the carboxylic acid is 9-decenoic acid, 9-undecenoic acid, or 9-dodecenoic acid.

In some embodiments, the olefinic ester compounds are methyl 9-decenoate, methyl 9-undenenoate, methyl 9-dodecenoate, or a mixture thereof. In some embodiments, the olefinic ester compounds are methyl 9-decenoate, methyl 9-dodecenoate, or a mixture thereof. In some other embodiments, the olefinic ester compounds are methyl 9-decenoate. In some other embodiments, the olefinic ester compounds are methyl 9-dodecenoate.

In some embodiments, the olefinic ester compounds are one or more compounds of formula (I):

wherein:
$R^1$ is $C_{9-17}$ alkenyl; and
$R^2$ is $C_{1-6}$ alkyl or $C_{3-10}$ cycloaklanol.

In some embodiments, $R^1$ is $C_{9-15}$ alkenyl. In some embodiments, $R^1$ is $C_{9-14}$ alkenyl. In some embodiments, $R^1$ is $C_{9-13}$ alkenyl. In some embodiments, $R^1$ is $C_{9-11}$ alkenyl. In some embodiments, $R^1$ is $C_{11-15}$ alkenyl. In some embodiments, $R^1$ is $C_{11-14}$ alkenyl. In some embodiments, $R^1$ is $C_{11-13}$ alkenyl. In some embodiments, $R^1$ is $C_9$ alkenyl or $C_{11}$ alkenyl. In some embodiments, $R^1$ is $C_9$ alkenyl. In some embodiments, $R^1$ is $C_{11}$ alkenyl. In some such embodiments, $R^1$ has one to three carbon-carbon double bonds, which, when multiple carbon-carbon double bonds are present, in some embodiments, are not conjugated. In some embodiments, $R^1$ has a single carbon-carbon-double bond. In some other embodiments, $R^1$ has two non-conjugated double bonds. In some other embodiments, $R^1$ has two or three conjugated double bonds, such as a $C_{13-15}$ alkenyl having two or three conjugated carbon-carbon double bonds. In some embodiments, $R^1$ is —$(CH_2)_7$—CH=$CH_2$, —$(CH_2)_7$—CH=CH—$CH_3$, or —$(CH_2)_7$—CH=CH—$CH_2$—$CH_3$. In some embodiments, $R^1$ is —$(CH_2)_7$—CH=$CH_2$ or —$(CH_2)_7$—CH=CH—$CH_2$—$CH_3$. In some embodiments, $R^1$ is —$(CH_2)_7$—CH=$CH_2$. In some embodiments, $R^1$ is —$(CH_2)_7$—CH=CH—$CH_2$—$CH_3$.

In some embodiments, $R^2$ is methyl, ethyl, isopropyl, propyl, butyl, isobutyl, sec-butyl, tert-butyl, pentyl, isoamyl, neopentyl, or hexyl. In some embodiments, $R^2$ is methyl, ethyl, isopropyl, propyl, butyl, isobutyl, sec-butyl, or tert-butyl. In some embodiments, $R^2$ is methyl, ethyl, or isopropyl. In some embodiments, $R^2$ is methyl or ethyl. In some embodiments, $R^2$ is methyl. In some embodiments, $R^2$ is cyclopentyl or cyclohexyl. In some embodiments, $R^2$ is cyclohexyl.

In some embodiments, the composition also includes water. Any suitable amount of water can be included relative to the olefinic ester compounds. For example, in some embodiments, the weight-to-weight ratio of water to the olefinic ester compounds ranges from 1:1 to 100:1, or from 1:1 to 50:1, or from 1:1 to 25:1, or from 1:1 to 15:1, or from 1:1 to 10:1. In some such embodiments, the composition is an emulsion, such as a microemulsion. In some embodiments, the emulsions (or microemulsions) include a continuous phase and a dispersed phase. In some embodiments, the emulsion is an oil-in-water emulsion, where the dispersed phase includes olefinic ester compounds and where the continuous phase includes water. In some other embodiments, the emulsion is a water-in-oil emulsion, where the dispersed phase includes water and where the continuous phase includes olefinic ester compounds.

In such emulsions, the olefinic ester compounds can make up any suitable amount of any phase that includes them. In some embodiments, for example, where the emulsion is an oil-in-water emulsion, the olefinic ester compounds make up at least 50 percent by weight, or at least 60 percent by weight, or at least 70 percent by weight, or at least 80 percent by weight, or at least 90 percent by weight, or at least 95 percent by weight of the dispersed phase, based on the total weight of the dispersed phase (excluding the weight of any surfactant). In some such embodiments, the olefinic ester compounds make up no more than 99 percent by weight of the dispersed phase, based on the total weight of the dispersed phase (excluding the weight of any surfactant). In some embodiments, for example, where the emulsion is a water-in-oil emulsion, the olefinic ester compounds make up at least 50 percent by weight, or at least 60 percent by weight, or at least 70 percent by weight, or at least 80 percent by weight, or at least 90 percent by weight, or at least 95 percent by weight of the continuous phase, based on the total weight of the continuous phase (excluding the weight of any surfactant). In some such embodiments, the olefinic ester compounds make up no more than 99 percent by weight of the continuous phase, based on the total weight of the continuous phase (excluding the weight of any surfactant).

In some such embodiments, the composition further comprises saturated ester compounds. As another example, the weight-to-weight ratio of saturated ester compounds to olefinic ester compounds in the composition ranges from 1:10 to 10:1, or from 1:5 to 5:1, or from 1:3 to 3:1, or from 1:2 to 2:1. Any suitable saturated fatty acid ester can be used, such as $C_{1-6}$ alkanolic esters of $C_{10-18}$ saturated fatty acids, such as $C_{1-6}$ alkanolic esters (e.g., methyl esters, ethyl esters, isopropyl esters, etc.) of capric acid, lauric acid, myristic acid, palmitic acid, stearic acid, and the like.

In some embodiments, the composition can also include one or more terpene compounds. Any suitable terpene compounds can be used. For example, in some embodiments, the composition includes linacool, geraniol, nopol, α-terpineol, β-terpineol, γ-terpineol, 4-terpineol, menthol, eucapytol, menthone, d-limonene, terpinolene, α-ocimene, β-ocimene, α-terpinene, β-terpinene, γ-terpinene, δ-terpinene, α-pinene, β-pinene, citronellene, turpentine, and any combinations thereof. In some embodiments, the composition includes d-limonene. In some embodiments, the composition includes α-pinene. In some embodiments, the composition includes α-terpineol. In some embodiments, the composition includes nopol. In some embodiments, the composition includes both nopol and d-limonene. The means of incorporating terpenes into compositions such as those disclosed herein are known in the art, and are described in detail in U.S. Pat. No. 9,068,108, which is incorporated herein by reference.

In some embodiments, the compositions include one or more surfactants (according to any of the embodiments described below), such as non-ionic surfactants, anionic surfactants, cationic surfactants, or zwitterionic surfactants. In some such embodiments, the compositions include one or more non-ionic surfactants. In some such embodiments, the compositions include one or more anionic surfactants. In some such embodiments, the compositions include one or more cationic surfactants. In some such embodiments, the compositions include one or more zwitterionic surfactants.

In some such embodiments, the microemulsion may comprise a single surfactant or a combination of two or more surfactants. For example, in some embodiments, the surfactant comprises a first type of surfactant and a second type of surfactant. The term surfactant encompasses cationic surfactants, anionic surfactants, amphoteric surfactants, non-ionic surfactants, zwitterionic surfactants, and mixtures thereof. In some embodiments, the surfactant is a nonionic surfactant. Nonionic surfactants generally do not contain any charges. Amphoteric surfactants generally have both positive and negative charges, however, the net charge of the surfactant can be positive, negative, or neutral, depending on the pH of the solution. Anionic surfactants generally possess a net negative charge. Cationic surfactants generally possess a net positive charge.

Suitable surfactants for use with the compositions and methods described herein will be known in the art. In some embodiments, the surfactant is an alkyl polyglycol ether, for example, having 2-40 ethylene oxide (EO) units and alkyl groups of 4-20 carbon atoms. In some embodiments, the surfactant is an alkylaryl polyglycol ether having 2-40 EO units and 8-20 carbon atoms in the alkyl and aryl groups. In some embodiments, the surfactant is an ethylene oxide/propylene oxide (EO/PO) block copolymer having 8-40 EO or PO units. In some embodiments, the surfactant is a fatty acid polyglycol ester having 6-24 carbon atoms and 2-40 EO units. In some embodiments, the surfactant is a polyglycol ether of hydroxyl-containing triglycerides (e.g., castor oil). In some embodiments, the surfactant is an alkylpolyglycoside of the general formula R"—O—$Z_n$, where R" denotes a linear or branched, saturated or unsaturated alkyl group having on average 8-24 carbon atoms and $Z_n$ denotes an oligoglycoside group having on average n=1-10 hexose or pentose units or mixtures thereof. In some embodiments, the surfactant is a fatty ester of glycerol, sorbitol, or pentaerythritol. In some embodiments, the surfactant is an amine oxide (e.g., dodecyldimethylamine oxide). In some embodiments, the surfactant is an alkyl sulfate, for example having a chain length of 8-18 carbon atoms, alkyl ether sulfates having 8-18 carbon atoms in the hydrophobic group and 1-40 ethylene oxide (EO) or propylene oxide (PO) units. In some embodiments, the surfactant is a sulfonate, for example, an alkyl sulfonate having 8-18 carbon atoms, an alkylaryl sulfonate having 8-18 carbon atoms, an ester or half ester of sulfosuccinic acid with monohydric alcohols or alkylphenols having 4-15 carbon atoms. In some cases, the alcohol or alkylphenol can also be ethoxylated with 1-40 EO units. In some embodiments, the surfactant is an alkali metal salt or ammonium salt of a carboxylic acid or poly(alkylene glycol) ether carboxylic acid having 8-20 carbon atoms in the alkyl, aryl, alkaryl or aralkyl group and 1-40 EO or PO units. In some embodiments, the surfactant is a partial phosphoric ester or the corresponding alkali metal salt or ammonium salt, e.g. an alkyl and alkaryl phosphate having 8-20 carbon atoms in the organic group, an alkylether phosphate or alkarylether phosphate having 8-20 carbon atoms in the alkyl or alkaryl group and 1-40 EO units. In some embodiments, the surfactant is a salt of primary, secondary, or tertiary fatty amine having 8-24 carbon atoms with acetic acid, sulfuric acid, hydrochloric acid, and phosphoric acid. In some embodiments, the surfactant is a quaternary alkyl- and alkylbenzylammonium salt, whose alkyl groups have 1-24 carbon atoms (e.g., a halide, sulfate, phosphate, acetate, or hydroxide salt). In some embodiments, the surfactant is an alkylpyridinium, an alkylimidazolinium, or an alkyloxazolinium salt whose alkyl chain has up to 18 carbons atoms (e.g., a halide, sulfate, phosphate, acetate, or hydroxide salt). In some embodiments, the surfactant is amphoteric, including sultaines (e.g., cocamidopropyl hydroxysultaine), betaines (e.g., cocamidopropyl betaine), or phosphates (e.g., lecithin). Non-limiting examples of specific surfactants include a linear $C_{12}$-$C_{15}$ ethoxylated alcohols with 5-12 moles of EO, lauryl alcohol ethoxylate with 4-8 moles of EO, nonyl phenol ethoxylate with 5-9 moles of EO, octyl phenol ethoxylate with 5-9 moles of EO, tridecyl alcohol ethoxylate with 5-9 moles of EO, Pluronic® matrix of EO/PO copolymers, ethoxylated cocoamide with 4-8 moles of EO, ethoxylated coco fatty acid with 7-11 moles of EO, and cocoamidopropyl amine oxide.

The surfactants can be used in any suitable manner. In some embodiments, the surfactant(s) are matched to and/or optimized for the particular oil or solvent in use. In some embodiments, the surfactant(s) are selected by mapping the phase behavior of the microemulsion and choosing the surfactant(s) that gives the desired range of stability. In some cases, the stability of the microemulsion over a wide range of temperatures is targeting as the microemulsion may be subject to a wide range of temperatures due to the environmental conditions present at the subterranean formation.

In embodiments that include surfactants, any suitable surfactants can be used. For example, in some embodiments, the surfactants used in the composition can include surfactants having an HLB (hydrophile-lipophile balance) of 4 to 14, or 8 to 13. In some embodiments, the surfactants used in the composition include the amine salts (e.g., the isopropyl amine salt) of dodecylbenzene sulfonic acid, the amine salts (e.g., the isopropyl amine salt) of oleic acid, linear alcohol alkoxylates, branched alcohol alkoxylates, alkyl phenol alkoxylates, fatty amides, fatty alkanolamides, fatty amine alkoxylates, sorbitan esters, glycerol esters, and combinations thereof. Other examples of suitable nonionic surfactants include, but are not limited to, linear alcohol alkoxylates, branched alcohol alkoxylates, alkyl phenol alkoxylates, fatty amides, fatty alkanolamides, fatty amine alkoxylates, and combinations thereof. Some other examples of suitable anionic surfactants include, but are not limited to, water-soluble salts of alkyl benzene sulfonates, alkyl sulfates, alkyl polyalkoxy ether sulfates, paraffin sulfonates, alpha-olefin sulfonates and sulfosuccinates, alpha-sulfocarboxylates and their esters, alkyl glyceryl ether sulfonates, fatty acid monoglyceride sulfates and sulfonates, alkyl phenol polyalkoxyether sulfates and combinations thereof. Other examples of suitable anionic surfactants include, but are not limited to, the water-soluble salts or esters of alpha-sulfonated fatty acids containing from about 6 to about 20 carbon atoms in the fatty acid group and from about 1 to about 10 carbon atoms in the ester group.

Surfactants can also be added to the finished composition to alleviate potential customers of the need to select a surfactant that may be suitable for particular end uses.

In some embodiments, nonionic surfactants having an HLB of from about 4 to about 14, or from 8 to 13, may be suitable in the preparation of a microemulsion. Non-limiting examples of such surfactants include, but are not limited to, linear alcohol alkoxylates, branched alcohol alkoxylates, alkyl phenol alkoxylates, fatty amides, fatty amide alkoxylates, fatty amine alkoxylates and combinations thereof.

In some embodiments, cationic surfactants can be used. Suitable cationic surfactants include, but are not limited to, water-soluble quaternary ammonium salts fatty amines, ammonium salts of fatty amines, quaternary ammonium salts of ethoxylated fatty amines, ammonium salts of ethoxylated fatty amines, quaternary ammonium salts of modified alkyl polyglucosides, and combinations thereof.

In some embodiments, nonionic surfactants and/or amphoteric surfactants can be used, e.g., nonionic surfactants having an HLB of from 4 to 14, or 8 to 13, e.g., in a microemulsion. Non-limiting examples of nonionic surfactants include, but are not limited to, linear alcohol alkoxylates, branched alcohol alkoxylates, alkyl phenol alkoxylates, fatty amides, fatty amide alkoxylates, fatty amine alkoxylates and combinations thereof. Non-limiting examples of amphoteric surfactants include, but are not limited to, water-soluble $C_{6-12}$ fatty amidoamine betaines, $C_{6-12}$ fatty amidoamine sultaines and hydroxysultaines, $C_{6-12}$ fatty amidoamine oxides, fatty iminodiproponiates, $C_{6-12}$ fatty amine betaines, $C_{6-12}$ fatty amines sultaines, $C_{6-12}$ fatty amine hydroxysultaines, $C_{6-12}$ fatty amine oxides, and combinations thereof.

In some embodiments, other surfactants can be used, either in combination with one or more of anionic, cationic and/or amphoteric surfactants (e.g., as short-chain co-surfactants) or alone. Non-limiting examples of such other surfactants include, but are not limited to, $C_{3-6}$ alcohols, glycols, glycol ethers, pyrrolidones, glycol ether esters, and combinations thereof.

In some embodiments, the relative amounts of the components of the composition will vary according to the end use of the composition and can be any amounts required to clean a particular undesirable substance from a particular surface. The amount of non-ionic surfactant, for example, can vary from 1 to 75 percent by weight, or from 2 to 60 percent by weight, or from 3 to 50 percent by weight, or from 5 to 40 percent by weight, or from 5 to 30 percent by weight, or from 5 to 20 percent by weight, based on the total weight of the composition (e.g., the undiluted, pre-emulsified composition). In some embodiments, such compositions are emulsified by mixing them with an aqueous medium to form an oil-in-water emulsion or a water-in-oil emulsion. Suitable emulsifiers can be added to assist in the emulsification. Any suitable degree of dilution can be used, depending on the intended end use, the desired concentration of solvent, and other ingredients.

In some embodiments, the surfactants (e.g., non-ionic surfactants) can have certain ranges of HLB values. In some embodiments, the surfactants (e.g., non-ionic surfactants) have a HLB value ranging from 4 to 10, or from 5 to 9, or from 6 to 8. In some embodiments, the composition comprises at least one non-ionic surfactant having an HLB value of about 4, or an HLB value of about 5, or an HLB value of about 6, or an HLB value of about 7, or an HLB value of about 8, or an HLB value of about 9.

In some embodiments, the surfactants (e.g., non-ionic surfactants) can have certain ranges of molecular weights. In some embodiments, the surfactants (e.g., non-ionic surfactants) have a molecular weight ranging from 200 to 800 amu, or from 250 to 700 amu, or from 300 to 600 amu. In some embodiments, the composition comprises at least one non-ionic surfactant having a molecular weight of about 350 amu, or a molecular weight of about 400 amu, or a molecular weight of about 450 amu, or a molecular weight of about 500 amu, or a molecular weight of about 550 amu, or a molecular weight of about 600 amu, or a molecular weight of about 650 amu.

In some embodiments, the surfactants are ethoxylated fatty acids or ethoxylated alcohols. For example, in some non-limiting examples, the surfactants are ethoxylated alcohols, where the alcohols have 8 to 16 carbon atoms, or 10 to 15 carbon atoms, or 12 to 15 carbon atoms. The ethoxylated chains of such alcohols can have any suitable number of ethylene oxide units. For example, in some embodiments, the surfactants have from 5 to 12 ethylene oxide units, or from 7 to 10 ethylene oxide units. In some embodiments, the ethoxylated alcohols have a number-average number of ethylene oxide units of about 5, or of about 7, or of about 9, or of about 11, or of about 12. Analogous such ethyoxylated fatty acids can be used as well.

In some embodiments, the composition comprises water. In some such embodiments, the composition is an emulsion, meaning that the composition includes two or more phases where at least one of the phases is at least partially dispersed in one or more of the other phases. In some further such embodiments, the composition is a microemulsion or a nanoemulsion, meaning that at least one of the phases is dispersed as small droplets whose size is on the order of about 1 nm up to about 1 micron. In some embodiments, the droplet size is less than the wavelength of the lowest energy visible light, e.g., less than 350 nm, or less than 300 nm, or less than 250 nm, or less than 200 nm, or less than 150 nm, or less than 100 nm, down to about 50 nm.

The surfactant may be present in the microemulsion in any suitable amount. In some embodiments, the surfactant is present in an amount from 10 wt % to 70 wt %, or from 15 wt % to 55 wt %, or from 20 wt % to 50 wt %, based on the total weight of the microemulsion composition.

In some embodiments, the compositions can include one or more additional ingredients or additives. Such additional ingredients or additives include, but are not limited to, carriers, solvents, co-solvents (such as longer-chain olefinic ester compounds), surfactants, co-surfactants, emulsifiers, natural or synthetic colorants, natural or synthetic fragrances, natural or synthetic deodorizers, antioxidants, corrosion inhibitors, chelating agents, precipitating and/or sequestering builders, and antimicrobial agents. These agents can be used in any suitable amounts, depending on the types of other ingredients in the composition (e.g., anionic surfactants, cationic surfactants, non-ionic surfactants, etc.), the amounts of other ingredients in the composition (e.g., amount of various surfactants), whether the composition is to be formulated as an emulsion, and, if so, what type of emulsion it will be (e.g., oil-in-water, water-in-oil, etc.), and what the desired range of end-uses will be.

In some embodiments, the compositions disclosed herein include one or more freezing point depression agents. The composition can include a single freezing point depression agent or a combination of two or more freezing point depression agent. For example, in some embodiments, the freezing point depression agent comprises a first type of freezing point depression agent and a second type of freezing point depression agent. A solution comprising the freezing point depression agent has a lower freezing point as compared to an essentially identical solution not comprising the freezing point depression agent.

Any suitable freezing point depression agents can be used in the compositions disclosed herein. Non-limiting examples of freezing point depression agents include primary, secondary, and tertiary alcohols with from 1 to 20 carbon atoms. In some embodiments, the alcohol comprises at least 2 carbon atoms, alkylene glycols including polyalkylene glycols, and salts. Non-limiting examples of alcohols include methanol, ethanol, i-propanol, n-propanol, t-butanol, n-butanol, n-pentanol, n-hexanol, and 2-ethyl-hexanol. In some embodiments, the freezing point depression agent is not methanol (e.g., due to toxicity). Non-limiting examples of alkylene glycols include ethylene glycol (EG), polyethylene glycol (PEG), propylene glycol (PG), and triethylene glycol (TEG). In some embodiments, the freezing point depression agent is not ethylene oxide (e.g., due to toxicity). Non-limiting examples of salts include salts comprising K, Na, Br, Cr, Cr, Cs, or Bi, for example, halides of these metals, including NaCl, KCl, CaCl$_2$, and MgCl$_2$. In some embodiments, the freezing point depression agent comprises an alcohol and an alkylene glycol. In some embodiments, the compositions including the freezing point depression agent is stable over a wide range of temperatures, for example, from −25° F. to 150° F.

The freezing point depression agent may be present in the microemulsion in any suitable amount. In some embodiments, the freezing point depression agent is present in an amount from 1 wt % to 40 wt %, or from 3 wt % to 20 wt %, or from 8 wt % to 16 wt %, based on the total weight of the composition.

The composition can contain any suitable distribution of olefinic ester compounds. For example, in some embodiments, the composition includes at least 50 percent by weight, or at least 60 percent by weight, or at least 70 percent by weight, or at least 80 percent by weight alkanol esters (e.g., methyl esters) of C$_{10-12}$ carboxylic acids having one or more carbon-carbon double bonds, based on the total weight of olefinic ester compounds and saturated ester compounds in the composition. In some embodiments, said C$_{10-12}$ carboxylic acids have one carbon-carbon double bond. In some embodiments, the composition includes at least 50 percent by weight, or at least 60 percent by weight, or at least 70 percent by weight, or at least 75 percent by weight of methyl esters of 9-decenoic acid, 9-undecenoic acid, or 9-dodecenoic acid, based on the total weight of olefinic ester compounds and saturated ester compounds in the composition. In some embodiments, the composition includes at least 50 percent by weight, or at least 60 percent by weight, or at least 70 percent by weight, or at least 75 percent by weight of methyl esters of 9-decenoic acid or 9-dodecenoic acid, based on the total weight of olefinic ester compounds and saturated ester compounds in the composition. In some such embodiments, the composition includes no more than 20 percent by weight, or no more than 15 percent by weight, or no more than 10 percent by weight of saturated ester compounds, based on the total weight of olefinic ester compounds and saturated ester compounds. In some embodiments, the composition includes: (a) 20 to 50 percent by weight, or 30 to 40 percent by weight of $C_{10}$ olefinic ester compounds (e.g., methyl esters of 9-decenoic acid); (b) 30 to 60 percent by weight, or 40 to 50 percent by weight of $C_{12}$ olefinic ester compounds (e.g., methyl esters of 9-dodecenoic acid); and (c) 5 to 25 percent by weight, or 5 to 15 percent by weight of saturated ester compounds (e.g., methyl palmitate).

In some other embodiments, the composition includes at least 40 percent by weight, or at least 50 percent by weight, or at least 60 percent by weight, or at least 70 percent by weight, or at least 80 percent by weight, or at least 90 percent by weight, or at least 95 percent by weight, of $C_{10}$ olefinic ester compounds (e.g., alkanol esters of 9-dodecenoic acid), based on the total weight of the composition or the total weight of the oily phase of an oil-in-water emulsion (excluding surfactants). In some such embodiments, the composition includes 50 to 99 percent by weight, or 60 to 99 percent by weight, of $C_{10}$ olefinic ester compounds (e.g., alkanol esters of 9-dodecenoic acid), based on the total weight of the composition or the total weight of the oily phase of an oil-in-water emulsion (excluding surfactants).

In some other embodiments, the composition includes at least 40 percent by weight, or at least 50 percent by weight, or at least 60 percent by weight, or at least 70 percent by weight, or at least 80 percent by weight, or at least 90 percent by weight, or at least 95 percent by weight, of $C_{12}$ olefinic ester compounds (e.g., alkanol esters of 9-dodecenoic acid), based on the total weight of the composition or the total weight of the oily phase of an oil-in-water emulsion (excluding surfactants). In some such embodiments, the composition includes 50 to 99 percent by weight, or 60 to 99 percent by weight, of $C_{12}$ olefinic ester compounds (e.g., alkanol esters of 9-dodecenoic acid), based on the total weight of the composition or the total weight of the oily phase of an oil-in-water emulsion (excluding surfactants).

In some such embodiments, the composition can also include various amounts of $C_{13-15}$ olefinic ester compounds, e.g., alkanol esters of 9,12-tridecadienoic acid, alkanol esters of 9,12-pentadecadienoic acid, and the like. In some embodiments, the composition includes up to 30 percent by weight, or up to 25 percent by weight, or up to 20 percent by weight, or up to 15 percent by weight, or up to 10 percent by weight, $C_{13}$ olefinic ester compounds (e.g., alkanol esters of 9,12-tridecanedienoic acid), based on the total weight of the composition or the total weight of the oily phase of an oil-in-water emulsion (excluding surfactants). In some embodiments, the composition includes up to 35 percent by weight, or up to 30 percent by weight, or up to 25 percent by weight, or up to 20 percent by weight, or up to 15 percent by weight, $C_{15}$ olefinic ester compounds (e.g., alkanol esters of 9,12-pentadecanedienoic acid), based on the total weight of the composition or the total weight of the oily phase of an oil-in-water emulsion (excluding surfactants).

In some such embodiments, the composition can also include an amount of olefin, e.g., alkenes. In some embodiments, the composition includes from 1 to 10 percent by weight, or from 1 to 7 percent by weight, alkenes, based on the total weight of the composition or the total weight of the oily phase of an oil-in-water emulsion (excluding surfactants). In some embodiments, the composition includes from 2 to 10 percent by weight, or from 2 to 7 percent by weight, alkenes, based on the total weight of the composition or the total weight of the oily phase of an oil-in-water emulsion (excluding emulsifiers). In some embodiments, the composition includes from 3 to 10 percent by weight, or from 3 to 7 percent by weight, alkenes, based on the total weight of the composition or the total weight of the oily phase of an oil-in-water emulsion (excluding surfactants).

In some other embodiments, higher amounts of saturated ester compounds can be included in the composition. For example, in some embodiments, the composition includes at least 30 percent by weight, or at least 40 percent by weight of saturated ester compounds, such as methyl palmitate, methyl stearate, methyl laurate, etc., based on the total weight of olefinic ester compounds and saturated ester compounds in the composition. In some such embodiments, the amounts of $C_{10-12}$ unsaturated ester compounds can be lower. For example, in some embodiments, the composition includes no more than 50 percent by weight, or no more than 40 percent by weight, or no more than 35 percent by weight of $C_{10-12}$ unsaturated ester compounds (e.g., methyl 9-decenoate and methyl 9-dodecenoate). In some embodiments, the composition includes: (a) 5 to 30 percent by weight, or 5 to 20 percent by weight of $C_{10}$ olefinic ester compounds (e.g., methyl esters of 9-decenoic acid); (b) 5 to 30 percent by weight, or 10 to 20 percent by weight of $C_{12}$ olefinic ester compounds (e.g., methyl esters of 9-dodecenoic acid); and (c) 30 to 70 percent by weight, or 40 to 60 percent by weight of saturated ester compounds (e.g., methyl palmitate).

In some other embodiments, the composition includes at least 20 percent by weight, or at least 30 percent by weight, or at least 40 percent by weight of terminal olefinic ester compounds, based on the total weight of olefinic ester compounds in the composition. In some other embodiments, the composition includes no more than 30 percent by weight, or no more than 40 percent by weight, or no more than 50 percent by weight of terminal olefinic ester compounds, based on the total weight of olefinic ester compounds in the composition.

In some embodiments, the composition can include at least 50% by weight, or at least 60% by weight, or at least 70% by weight, or at least 80% by weight, of $C_{10-12}$ unsaturated ester compounds (e.g., methyl 9-decenoate and methyl 9-dodecenoate), as well as a ketone, such as cyclohexanone, e.g., in an amount of up to 5% by weight, or up to 10% by weight, or up to 15% by weight, or up to 20% by weight, based on the total weight of the composition. Such compositions can also include, in some embodiments, other fatty acids, such as oleic acid. In some embodiments, the composition can also include certain petroleum distillates, such as mineral oil (100 SUS).

Derivation from Renewable Sources

The olefinic ester compounds employed in any of the aspects or embodiments disclosed herein can, in certain embodiments, be derived from renewable sources, such as from various natural oils or their derivatives. Any suitable methods can be used to make these compounds from such renewable sources. Suitable methods include, but are not limited to, fermentation, conversion by bioorganisms, and conversion by metathesis.

Olefin metathesis provides one possible means to convert certain natural oil feedstocks into olefins and esters that can be used in a variety of applications, or that can be further modified chemically and used in a variety of applications. In some embodiments, a composition (or components of a composition) may be formed from a renewable feedstock, such as a renewable feedstock formed through metathesis reactions of natural oils and/or their fatty acid or fatty ester derivatives. When compounds containing a carbon-carbon double bond undergo metathesis reactions in the presence of a metathesis catalyst, some or all of the original carbon-carbon double bonds are broken, and new carbon-carbon double bonds are formed. The products of such metathesis reactions include carbon-carbon double bonds in different locations, which can provide unsaturated organic compounds having useful chemical properties.

A wide range of natural oils, or derivatives thereof, can be used in such metathesis reactions. Examples of suitable natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

The natural oil may include canola or soybean oil, such as refined, bleached and deodorized soybean oil (i.e., RBD soybean oil). Soybean oil typically includes about 95 percent by weight (wt %) or greater (e.g., 99 wt % or greater) triglycerides of fatty acids. Major fatty acids in the polyol esters of soybean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

Metathesized natural oils can also be used. Examples of metathesized natural oils include but are not limited to a metathesized vegetable oil, a metathesized algal oil, a metathesized animal fat, a metathesized tall oil, a metathesized derivatives of these oils, or mixtures thereof. For example, a metathesized vegetable oil may include metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, metathesized soybean oil, metathesized sunflower oil, metathesized linseed oil, metathesized palm kernel oil, metathesized tung oil, metathesized jatropha oil, metathesized mustard oil, metathesized camelina oil, metathesized pennycress oil, metathesized castor oil, metathesized derivatives of these oils, or mixtures thereof. In another example, the metathesized natural oil may include a metathesized animal fat, such as metathesized lard, metathesized tallow, metathesized poultry fat, metathesized fish oil, metathesized derivatives of these oils, or mixtures thereof.

Such natural oils, or derivatives thereof, can contain esters, such as triglycerides, of various unsaturated fatty acids. The identity and concentration of such fatty acids varies depending on the oil source, and, in some cases, on the variety. In some embodiments, the natural oil comprises one or more esters of oleic acid, linoleic acid, linolenic acid, or any combination thereof. When such fatty acid esters are metathesized, new compounds are formed. For example, in embodiments where the metathesis uses certain short-chain olefins, e.g., ethylene, propylene, or 1-butene, and where the natural oil includes esters of oleic acid, an amount of 1-decene and 1-decenoid acid (or an ester thereof), among other products, are formed. Following transesterification, for example, with an alkyl alcohol, an amount of 9-denenoic acid alkyl ester is formed. In some such embodiments, a separation step may occur between the metathesis and the transesterification, where the alkenes are separated from the esters. In some other embodiments, transesterification can occur before metathesis, and the metathesis is performed on the transesterified product.

In some embodiments, the natural oil can be subjected to various pre-treatment processes, which can facilitate their utility for use in certain metathesis reactions. Useful pre-treatment methods are described in United States Patent Application Publication Nos. 2011/0113679, 2014/0275681, and 2014/0275595, all three of which are hereby incorporated by reference as though fully set forth herein.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-metathesis and/or cross-metathesis reactions form a metathesized product wherein the metathesized product comprises olefins and esters.

In some embodiments, the low-molecular-weight olefin (or short-chain olefin) is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some embodiments, the short-chain olefin is 1-butene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, the unsaturated esters may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel; 9-decenoic acid ("9DA") esters, 9-undecenoic acid ("9UDA") esters, and/or 9-dodecenoic acid ("9DDA") esters; 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, multiple metathesis reactions can also be employed. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene, 1-butene, 2-butene, and the like). Such multiple metathesis can be useful in an industrial-scale reactor, where it may be easier to perform multiple metathesis than to modify the reactor to use a different alkene.

The conditions for such metathesis reactions, and the reactor design, and suitable catalysts are as described above with reference to the metathesis of the olefin esters. That discussion is incorporated by reference as though fully set forth herein.

In the embodiments above, the natural oil (e.g., as a glyceride) is metathesized, followed by transesterification. In some other embodiments, transesterification can precede metathesis, such that the fatty acid esters subjected to metathesis are fatty acid esters of monohydric alcohols, such as methanol, ethanol, or isopropanol.

Olefin Metathesis

In some embodiments, one or more of the unsaturated monomers can be made by metathesizing a natural oil or natural oil derivative. The terms "metathesis" or "metathesizing" can refer to a variety of different reactions, including, but not limited to, cross-metathesis, self-metathesis, ring-opening metathesis, ring-opening metathesis polymerizations ("ROMP"), ring-closing metathesis ("RCM"), and acyclic diene metathesis ("ADMET"). Any suitable metathesis reaction can be used, depending on the desired product or product mixture.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-metathesis and/or cross-metathesis reactions form a metathesized product wherein the metathesized product comprises olefins and esters.

In some embodiments, the low-molecular-weight olefin is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, terminal olefins and internal olefins may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel; 9-decenoic acid ("9DA") esters, 9-undecenoic acid ("9UDA") esters, and/or 9-dodecenoic acid ("9DDA") esters; 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, the methods disclosed herein can employ multiple metathesis reactions. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene, 1-butene, 2-butene, and the like). Such multiple metathesis can be useful in an industrial-scale reactor, where it may be easier to perform multiple metathesis than to modify the reactor to use a different alkene.

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments where a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases include helium, neon, argon, and nitrogen, used individually or in with each other and other inert gases.

The rector design for the metathesis reaction can vary depending on a variety of factors, including, but not limited to, the scale of the reaction, the reaction conditions (heat, pressure, etc.), the identity of the catalyst, the identity of the materials being reacted in the reactor, and the nature of the feedstock being employed. Suitable reactors can be designed by those of skill in the art, depending on the relevant factors, and incorporated into a refining process such, such as those disclosed herein.

The metathesis reactions disclosed herein generally occur in the presence of one or more metathesis catalysts. Such methods can employ any suitable metathesis catalyst. The metathesis catalyst in this reaction may include any catalyst or catalyst system that catalyzes a metathesis reaction. Any known metathesis catalyst may be used, alone or in combination with one or more additional catalysts. Examples of metathesis catalysts and process conditions are described in US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst includes a Grubbs-type olefin metathesis catalyst and/or an entity derived therefrom. In some embodiments, the metathesis catalyst includes a first-generation Grubbs-type olefin metathesis catalyst and/or an entity derived therefrom. In some embodiments, the metathesis catalyst includes a second-generation Grubbs-type olefin metathesis catalyst and/or an entity derived therefrom. In some embodiments, the metathesis catalyst includes a first-generation Hoveyda-Grubbs-type olefin metathesis catalyst and/or an entity derived therefrom. In some embodiments, the metathesis catalyst includes a second-generation Hoveyda-Grubbs-type olefin metathesis catalyst and/or an entity derived therefrom. In some embodiments, the metathesis catalyst includes one or a plurality of the ruthenium carbene metathesis catalysts sold by Materia, Inc. of Pasadena, Calif. and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

In some embodiments, the metathesis catalyst includes a molybdenum and/or tungsten carbene complex and/or an entity derived from such a complex. In some embodiments, the metathesis catalyst includes a Schrock-type olefin metathesis catalyst and/or an entity derived therefrom. In some embodiments, the metathesis catalyst includes a high-oxidation-state alkylidene complex of molybdenum and/or an entity derived therefrom. In some embodiments, the metathesis catalyst includes a high-oxidation-state alkylidene complex of tungsten and/or an entity derived therefrom. In some embodiments, the metathesis catalyst includes molybdenum (VI). In some embodiments, the metathesis catalyst includes tungsten (VI). In some embodiments, the metathesis catalyst includes a molybdenum- and/or a tungsten-containing alkylidene complex of a type described in one or more of (a) Angew. Chem. Int. Ed. Engl., 2003, 42, 4592-4633; (b) Chem. Rev., 2002, 102, 145-179; and/or (c) Chem. Rev., 2009, 109, 3211-3226, each of which is incorporated by reference herein in its entirety, except that in the event of any inconsistent disclosure or definition from the present specification, the disclosure or definition herein shall be deemed to prevail.

In certain embodiments, the metathesis catalyst is dissolved in a solvent prior to conducting the metathesis reaction. In certain such embodiments, the solvent chosen may be selected to be substantially inert with respect to the metathesis catalyst. For example, substantially inert solvents include, without limitation: aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc. In some embodiments, the solvent comprises toluene.

In other embodiments, the metathesis catalyst is not dissolved in a solvent prior to conducting the metathesis reaction. The catalyst, instead, for example, can be slurried with the natural oil or unsaturated ester, where the natural oil or unsaturated ester is in a liquid state. Under these conditions, it is possible to eliminate the solvent (e.g., toluene) from the process and eliminate downstream olefin losses when separating the solvent. In other embodiments, the metathesis catalyst may be added in solid state form (and not slurried) to the natural oil or unsaturated ester (e.g., as an auger feed).

The metathesis reaction temperature may, in some instances, be a rate-controlling variable where the temperature is selected to provide a desired product at an acceptable rate. In certain embodiments, the metathesis reaction temperature is greater than −40° C., or greater than −20° C., or greater than 0° C., or greater than 10° C. In certain embodiments, the metathesis reaction temperature is less than 200° C., or less than 150° C., or less than 120° C. In some embodiments, the metathesis reaction temperature is between 0° C. and 150° C., or is between 10° C. and 120° C.

The metathesis reaction can be run under any desired pressure. In some instances, it may be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than 0.1 atm (10 kPa), or greater than 0.3 atm (30 kPa), or greater than 1 atm (100 kPa). In some embodiments, the reaction pressure is no more than about 70 atm (7000 kPa), or no more than about 30 atm (3000 kPa). In some embodiments, the pressure for the metathesis reaction ranges from about 1 atm (100 kPa) to about 30 atm (3000 kPa).

Use for Well Stimulation

In certain aspects, the disclosed compositions are suitable for stimulating an oil or gas well. In some such embodiments, the compositions are suitable for injection into a subterranean gas well (e.g., under hydraulic pressure) to create fractures through which natural gas (or, in some instances, oil) can flow. Such gas is often referred to as shale gas, tight gas, etc. In some embodiments, such compositions include a major amount of water. For example, in some embodiments, the compositions include at least 50 percent by weight, or at least 60 percent by weight, or at least 70 percent by weight, or at least 80 percent by weight, or at least 90 percent by weight, or at least 95 percent by weight, water, based on the total weight of liquid ingredients in the composition. In some embodiments, such liquid compositions are mixed or slurried with solid components, such as sand. The compositions can include any suitable amount of the olefinic ester compositions of any of the above embodiments. For example, in some embodiments, the compositions include up to 5 percent by weight, or up to 3 percent by weight, or up to 2 percent by weight, or up to 1 percent by weight, or up to 0.5 percent by weight, of olefinic ester compounds, based on the total weight of liquid ingredients in the composition. In any of the aforementioned embodiments, the compositions include at least 0.01 percent by weight, or at least 0.05 percent by weight, or at least 0.1 percent by weight, of olefinic ester compounds, based on the total weight of liquid ingredients in the composition.

In certain aspects, the disclosure provides methods for stimulating an oil gas well, including: providing a composition according to the above embodiments, which is optionally mixed or slurried with solid particles (e.g., sand particles); and introducing composition into an oil or gas well, e.g., injecting under pressure.

What is claimed is:

1. A composition for stimulating an oil or gas well, the composition comprising olefinic ester compounds and a terpene, wherein the olefinic ester compounds comprise methyl 9-decenoate, methyl 9-dodecenoate, or combinations thereof, and wherein the composition is an oil-in-water emulsion having a continuous phase comprising water and a dispersed phase comprising the olefinic ester compounds, and wherein methyl 9-decenoate, methyl 9-dodecenoate, or combinations thereof make up at least 50 percent by weight of the dispersed phase.

2. The composition of claim 1, further comprising a surfactant.

3. The composition of claim 1, wherein the terpene is selected from the group consisting of linacool, geraniol, nopol, α-terpineol, β-terpineol, γ-terpineol, 4-terpineol, menthol, eucapytol, menthone, d-limonene, terpinolene, α-ocimene, β-ocimene, α-terpinene, β-terpinene, γ-terpinene, δ-terpinene, α-pinene, β-pinene, citronellene, turpentine, and any combinations thereof.

4. The composition of claim 1, further comprising a carrier, an additional solvent, a co-solvents, a surfactant, a co-surfactant, an emulsifier, a natural or synthetic colorant, a natural or synthetic fragrance, an antioxidant, a corrosion inhibitor, or an antimicrobial agent, a freezing point depressant, or any combinations thereof.

5. The composition of claim 2, wherein the surfactant is selected from the group consisting of an anionic surfactant, a cationic surfactant, a non-ionic surfactant, and combinations thereof.

6. The composition of claim 5, wherein the surfactant is selected from the group consisting of an anionic surfactant, a non-ionic surfactant, and combinations thereof.

7. The composition of claim 6, wherein the surfactant is a non-ionic surfactant.

8. The composition of claim 7, wherein the non-ionic surfactant comprises one or more alkoxylated fatty acids.

9. The composition of claim 7, wherein the non-ionic surfactant has a hydrophilic-lipophilic balance (HLB) ranging from 4 to 10, where HLB is determined by Griffin's Method.

10. The composition of claim 1, wherein the olefinic ester compounds comprise methyl 9-decenoate.

11. The composition of claim 1, wherein the olefinic ester compounds comprise methyl 9-dodecenoate.

12. A method of stimulating an oil or gas well, comprising:
   providing a composition of claim 1; and
   introducing the composition into an oil or gas well.

* * * * *